United States Patent Office 3,679,358
Patented July 25, 1972

---

3,679,358
PROCESS FOR THE DYEING OR PRINTING OF TEXTILE MATERIALS MADE FROM POLYMERS OR COPOLYMERS OF ACRYLONITRILE
Konrad Lohe and Reinhard Mohr, Offenbach, Main, and Eberhard Mundlos and Hermann Freb, Heusenstamm, Germany, assignors to Farbwerke Hoechst Aktiengesellschaft vormals Meister Lucius & Bruning, Frankfurt am Main, Germany
No Drawing. Filed July 27, 1970, Ser. No. 64,870
Claims priority, application Germany, Aug. 21, 1969,
P 19 42 508.2
Int. Cl. D06p 3/70
U.S. Cl. 8—177 AB          6 Claims

---

ABSTRACT OF THE DISCLOSURE

Process for the dyeing or printing of textile materials made from polymers or copolymers of acrylonitrile, by using dyestuffs of the general formula

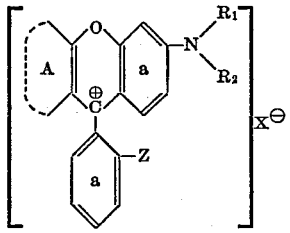

wherein $R_1$ and $R_2$ each stands for a hydrogen atom or optionally substituted lower alkyl group, Z represents a carboxylic acid ester group, A represents a phenylene radical which may contain non-ionic substituents optionally connected with one another to form a ring, but is free from amino groups, and $X^\ominus$ represents an anion and wherein the benzene nuclei $a$ may contain further non-ionic substituents.

---

The present invention relates to a process for the dyeing or printing of textile materials made from polymers or copolymers or acrylonitrile.

It is known that textile materials made from polyacrylonitrile can be dyed with xanthenium dyestuffs, for example Rhodamine B (Colour Index No. 45,170). The so-obtained dyeings, however, show only poor fastnesses to light.

It has now been found that textile materials made from polymers or copolymers of acrylonitrile can be dyed or printed in fast shades by using dyestuffs of the general Formula I

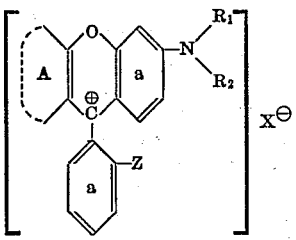

wherein $R_1$ and $R_2$ each stands for hydrogen atoms or optionally substituted lower alkyl groups, Z represents a carboxylic acid ester group, A represents a phenylene radical which may contain non-ionic substituents optionally connected with one another to form a ring but is free from amino groups, and $X^\ominus$ represents an anion and wherein the benzene nuclei $a$ may contain further non-ionic substituents.

The dyestuffs employed according to the present invention are obtainable by known methods, for example by condensation of phthalic acid anhydride with m-aminophenols having the general Formula II

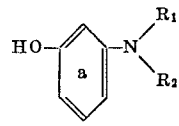

wherein $R_1$, $R_2$ and $a$ have the before-mentioned meaning, subsequent condensation of the intermediate so obtained with compounds of the general Formula III

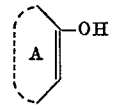

wherein A is defined as above, and esterification of the carboxylic acid group in the final reaction product. A number of the dyestuffs of said type is described in German patent specifications Nos. 106,720, 115,991, 122-289, and 128,574. The dyestuffs not yet described can be obtained in analogy to the known preparation methods.

As non-ionic substituents in the benzene nuclei $a$ as well as in the phenylene radical A, there may be considered, for example, halogen atoms or alkyl, alkoxy, aralkyl, aralkoxy, aryl, aryloxy or carboxylic acid ester groups, or optionally substituted carboxylic acid amide or sulfonic acid amide groups, cyano, nitro, hydroxy, trifluoromethyl, alkylsulfonyl, arylsulfonyl, acyloxy, acylamino, alkylsulfonylamino or arylsulfonylamino groups, which may, in the phenylene radical A, be connected to form an isocyclic or heterocyclic ring.

The anion $X^\ominus$ may represent any simple or complex inorganic or organic anion, for example a radical of sulfuric acid or its semi-esters, of an arylsulfonic acid, a hydrohalic acid or of another acid, such as phosphoric acid, acetic acid, oxalic acid, lactic acid or tartaric acid, or a chlorozincate radical.

Dyeing is carried out by treating the textile material in a neutral or acidic bath, preferably in a liquor containing acetic acid or a mineral acid, optionally in the presence of auxiliaries, and finishing the so-obtained dyeings in usual manner. The material to be dyed is generally introduced into the dyebath at temperatures of from about 40° to 60° C. and dyed at boiling temperature. Dyeing may also be carried out under an atmospheric excess pressure above 100° C.

For the printing of textile material made from polyacrylonitrile or its copolymers, the dyestuffs are applied together with the usual thickeners and optionally printing auxiliaries, and the dyestuffs are fixed in the usual manner by steaming.

As textile material to be dyed or printed according to the invention there may be considered fibres, threads, flocks, woven and knitted fabrics made from polymers of acrylonitrile or from copolymers of acrylonitrile with other vinyl compounds such as vinyl chloride, vinyl fluoride, vinylidene chloride, vinyl acetate or vinyl propionate, vinyl pyridine, vinyl imidazole, vinyl pyrrolidone or vinyl alcohol, or with acrylic or methacrylic acid esters or acrylic acid amides.

The dyeings or prints obtained with the dyestuffs applied according to invention are very clear and partly very brilliant and distinguish themselves by good fastness to light and wet processing.

The following examples serve to illustrate the process of invention:

EXAMPLE 1

100 g. of a pre-cleaned polyacrylonitrile staple fibre yarn are introduced into a dyebath heated to about 60° C., which contains 1 g. of crystallized sodium acetate and 5 g. of calcinated sodium sulfate in 3 liters of water;

the liquor is allowed to circulate for about 10 minutes and then a solution of 1 g. of the dyestuffs having the formula

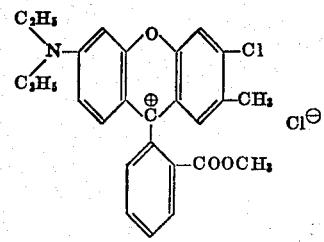

and 3 cc. of a 60% acetic acid in 1 liter of water is added. Subsequently, the bath temperature is raised relatively quickly up to 85° C., then slowly to 100° C., in the latter operation the temperature being increased by 1° C. during 3 to 4 minutes. When the boiling temperature is reached, the yarn is dyed for 1–1.5 hours, whereupon the bath is nearly completely exhausted. Then the dyebath is cooled to about 70° C., the dyed goods are rinsed in warm and cold water and dried.

A bright orange dyeing is obtained having very good fastnesses to light and wet processing.

EXAMPLE 2

5 g. of the dyestuff of the formula

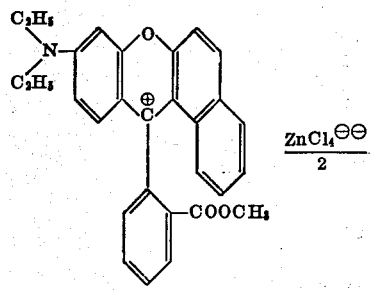

are mixed, while stirring, with 15 ml. of a 60% acetic acid and the mixture is dissolved in 1 liter of boiling water. This solution is poured into a prepared dyebath which contains, in 5 liters of water heated to 60° C., 1.2 g. of a dispersing agent of the alkylaryl polyglycol ether type, 5 g. of sodium acetate and 50 g. of calcinated sodium sulfate.

Subsequently, a pre-cleaned cross-wound bobbin consisting of about 500 g. of a staple fibre yarn made from polyacrylonitrile is introduced into the dyebath heated to about 60° C., the temperature of the bath is raised to 85° C. at alternating circulation of liquor and then slowly up to 100° C. The direction of liquor being alternating, dyeing is effected for about 1 hour at this temperature whereupon the bath is exhausted. Subsequently, the dyebath is cooled to about 70° C. and the dyeing is finished in a usual method.

A clear blush red dyeing is obtained exhibiting very good fastnesses to light and wet processing.

EXAMPLE 3

20 g. of the dyestuff of the formula

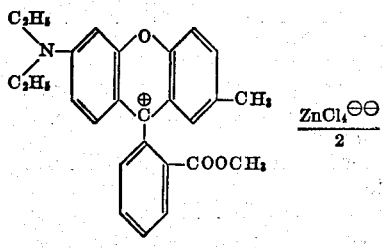

are dissolved hot together with 50 g. of β,β'-dihydroxydiethyl sulfide, 30 g. of cyclohexanol and 25 g. of a 60% acetic acid in 425 g. of water and the solution is stirred into 450 g. of a crystal gum thickening in a ratio of 1:2.

Polyacrylonitrile fabric is printed with this paste, dried and steamed for ½ hour at 0.2 atmospheres gauge. Thereupon, the printed fabric is rinsed, soaped at 50° C. with a bath containing 1 g. of a condensation product of oleic acid and methyltaurine per liter of water, rinsed and dried.

A clear orange print showing very good fastnesses to light and wet processing is obtained.

The following table lists further dyestuffs applicable according to the invention and the shades obtainable on polyacrylonitrile fibers.

| Dyestuff | | Shade |
|---|---|---|
| [xanthene with N(C₂H₅)₂, Cl, COOCH₃] | ZnCl₄²⁻ / 2 | Reddish orange. |
| [xanthene with N(C₂H₅)₂, OCH₃, COOCH₃] | Same | Bluish red. |
| [xanthene with N(C₂H₅)₂, Cl, OCH₃, COOCH₃] | ...do | Do. |
| [xanthene with N(CH₃)₂, OCH₃, COOCH₃] | ...do | Do. |
| [xanthene with N(C₂H₅)₂, Cl, COOCH₃] | ...do | Reddish orange. |
| [xanthene with N(C₂H₅)₂, CH₃, COOCH₃] | ...do | Do. |

| Dyestuff | | Shade |
|---|---|---|
| [xanthene dye: 3-dimethylamino, 6-chloro, 9-(2-methoxycarbonylphenyl)] | $\frac{ZnCl_4^{\ominus\ominus}}{2}$ | Redpish orange. |
| [xanthene dye: 3-dimethylamino, 7-chloro, 9-(2-methoxycarbonylphenyl)] | do | Do. |
| [benzo-fused xanthene dye: 3-dimethylamino, chloro, 9-(2-methoxycarbonylphenyl)] | do | Bluish red. |
| [xanthene dye: 3-dimethylamino, 6-chloro, 7-methyl, 9-(2-methoxycarbonylphenyl)] | do | Yellowish red. |
| [xanthene dye: 3-(N-methyl-N-ethyl)amino, 6-chloro, 7-methyl, 9-(2-methoxycarbonylphenyl)] | do | Do. |
| [xanthene dye: 3-diethylamino, 6-methoxycarbonyl, 9-(2-methoxycarbonylphenyl)] | $SO_4H^{\ominus}$ | Red. |
| [xanthene dye: 3-(N-methyl-N-ethyl)amino, 6-chloro, 7-methyl, 9-(2-ethoxycarbonylphenyl)] | $H_2PO_4^{\ominus}$ | Reddish orange. |
| [xanthene dye: 3-diethylamino, benzo-fused, 9-(2-ethoxycarbonylphenyl)] | $H_2PO_4^{\ominus\ominus}$ | Bluish red. |
| [xanthene dye: 3-diethylamino, 6-methoxycarbonyl, benzo-fused, 9-(2-methoxycarbonylphenyl)] | do | Do. |
| [xanthene dye: 3-diethylamino, benzo-fused with sulfonamide N(C$_2$H$_5$)$_2$, 9-(2-methoxycarbonylphenyl)] | $HSO_4^{\ominus}$ | Do. |
| [xanthene dye: 3-diethylamino, 6-carboxamide CONH$_2$, 9-(2-methoxycarbonylphenyl)] | $\frac{ZnCl_4^{\ominus\ominus}}{2}$ | Reddish orange. |
| [dibenzofuran-fused xanthene dye: 3-diethylamino, 9-(2-methoxycarbonylphenyl)] | $Cl^{\ominus}$ | Red. |
| [benzo-fused xanthene dye: 3-diethylamino, bromo, 9-(2-methoxycarbonylphenyl)] | $HSO_4^{\ominus}$ | Bluish red. |

TABLE—Continued

| Dyestuff | | Shade |
|---|---|---|
| 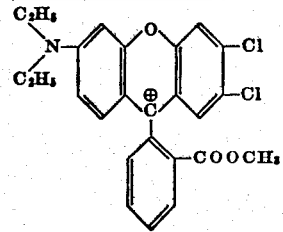 | $\dfrac{ZnCl_4^{\ominus\ominus}}{2}$ | Bluish red. |
| 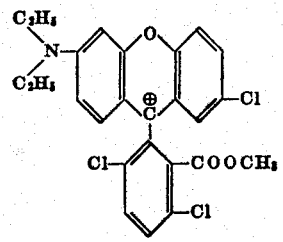 | $H_2PO_4^{\ominus}$ | Do. |
| 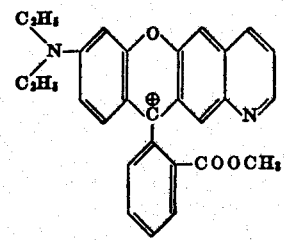 | $\dfrac{ZnCl_4^{\ominus\ominus}}{2}$ | Do. |

We claim:

1. A process for the dyeing or printing of textile materials made from polymers or copolymers of acrylonitrile, which comprises applying thereto dyestuffs of the general formula

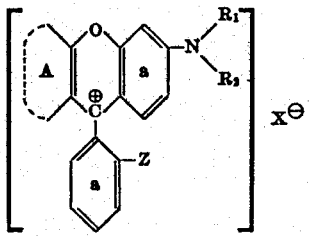

wherein $R_1$ and $R_2$ each stands for a hydrogen atom or an optionally substituted lower alkyl group, Z represents a carboxylic acid lower alkyl ester group, A represents a phenylene or naphthylene radical unsubstituted or substituted by one or two lower alkyl, lower alkoxy, carbo-lower alkoxy, carboxylic acid amide or sulfonic acid di-(lower alkyl)-amide groups or chlorine or bromine atoms, or a diphenylene oxide or quinoline radical, $X^{\ominus}$ represents an anion, and the benzene nuceli $a$ are unsubstituted or optionally substituted by one or two chlorine atoms.

2. A process as claimed in claim 1, wherein said dyestuff is of the formula

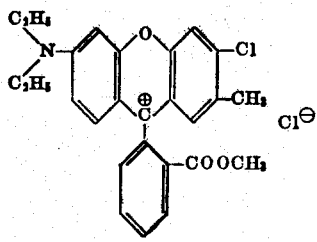

3. A process as claimed in claim 1, wherein said dyestuff is of the formula

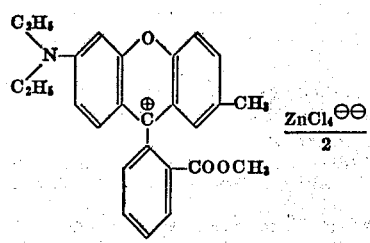

4. A process as claimed in claim 1, wherein said dyestuff is of the formula

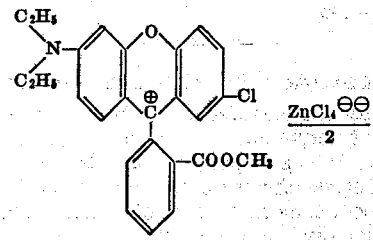

5. A process as claimed in claim 1, wherein said dyestuff is of the formula

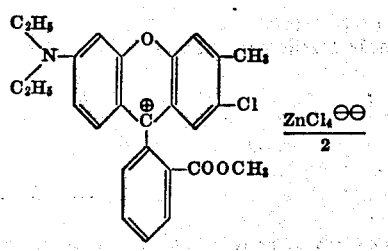

6. A process for the dyeing or printing of textile materials made from polymers or copolymers of acrylonitrile, which comprises applying thereto dyestuffs of the general formual

References Cited
FOREIGN PATENTS

| 394,114 | 6/1965 | Switzerland | 8—177 AB |
| 425,714 | 12/1966 | Switzerland | 8—177 AB |
| 106,720 | 10/1899 | Germany. | |
| 115,991 | 11/1900 | Germany. | |
| 122,289 | 7/1901 | Germany. | |
| 128,574 | 2/1902 | Germany. | |

GEORGE F. LESMES, Primary Examiner
T. J. HERBERT, JR., Assistant Examiner

U.S. Cl. X.R.
8—62